United States Patent
Johnson (12) United States Patent (10) Patent No.: US 7,831,702 B2
Johnson (45) Date of Patent: Nov. 9, 2010

(54) PLUG AND PLAY ENERGY EFFICIENCY SOLUTION AND AUTOMATIC DATA-PUSH METHOD FOR SAME

(76) Inventor: Jeffrey Wayne Johnson, 930 Lyall Street, Victoria, BC (CA) V9A 5E7

( * ) Notice: Subject to any disclaimer, the term of this patent is extended or adjusted under 35 U.S.C. 154(b) by 148 days.

(21) Appl. No.: 12/241,915

(22) Filed: Sep. 30, 2008

(65) Prior Publication Data
US 2010/0082792 A1    Apr. 1, 2010

(51) Int. Cl.
*G06F 15/173* (2006.01)
(52) U.S. Cl. .................... 709/223; 709/220; 709/224
(58) Field of Classification Search ............... None
See application file for complete search history.

(56) References Cited

U.S. PATENT DOCUMENTS

| | | | | |
|---|---|---|---|---|
| 5,650,936 A * | 7/1997 | Loucks et al. | ................. | 702/62 |
| 6,671,635 B1 * | 12/2003 | Forth et al. | ................. | 702/61 |
| 6,671,654 B1 * | 12/2003 | Forth et al. | ................. | 702/182 |
| 6,751,562 B1 * | 6/2004 | Blackett et al. | ................. | 702/61 |
| 6,763,377 B1 * | 7/2004 | Belknap et al. | ................. | 709/223 |
| 6,813,571 B2 * | 11/2004 | Lightbody et al. | ................. | 702/62 |
| 6,853,978 B2 * | 2/2005 | Forth et al. | ................. | 705/26 |
| 6,871,150 B2 * | 3/2005 | Huber et al. | ................. | 702/62 |
| 6,944,555 B2 * | 9/2005 | Blackett et al. | ................. | 702/62 |
| 7,085,824 B2 * | 8/2006 | Forth et al. | ................. | 709/221 |
| 7,203,723 B2 * | 4/2007 | Ogawa | ................. | 709/203 |
| 7,216,043 B2 * | 5/2007 | Ransom et al. | ................. | 702/62 |

OTHER PUBLICATIONS

IEEE P1615/D11 Draft Recommended Practice for Network Communication in Electric Power Substations. Nov. 2006. 86 pages.*
Technical Note, MeterM@il® Internal Email Client Feature, by Schneider Electric, May 2007 (14 pages).
A8812 AcquiSuite DR™ Data Acquisition Server, May 23, 2008 (2 pages).
Using the Web for Cost-effective Energy Information, by Jim Lewis and Steve Gerzog, Obvius LLC, 2003 (18 pages).
Instruction Bulletin, Powerlogic® Push Application; Setup Guide by Schneider Electric Dec. 2002 (39 pages).
Drawing, 2008 (1 page).

* cited by examiner

*Primary Examiner*—Vivek Srivastava
*Assistant Examiner*—Jeffrey R Swearingen (57) ABSTRACT

An energy efficiency solution for automatically pushing data measured by IEDs in a utility system to an Internet server. Before the utility system is commissioned, the manufacturer pre-configures each IED to automatically push measured data to the server at regular intervals and associates each IED with a unique identifier that is transmitted with the data and with a customer who has purchased the solution. After commissioning, the IEDs come online and begin to automatically push their measured data to the server. The customer logs into the website via a manufacturer-provided access code to access the measured data instantly. Requests to change the type of data pushed from IEDs and other configuration changes can be made via the website. Periodically, the IEDs ask whether any configuration updates exist, and if so, the server makes available to the IEDs the updated configuration. By having IEDs initiate communications for data transmission and configuration updates, intervening firewalls are bypassed.

17 Claims, 4 Drawing Sheets

PLUG AND PLAY ENERGY EFFICIENCY SOLUTION AND AUTOMATIC DATA-PUSH METHOD FOR SAME

FIELD OF THE INVENTION

The present invention relates generally to energy efficiency solutions, and in particular, to a plug-and-play energy efficiency solution and automatic data-push methods for the same.

BACKGROUND OF THE INVENTION

A utility system, such as an energy distribution system, can be monitored by a number of intelligent electronic devices (IEDs) that monitor or measure a quantity of a characteristic of the utility, such as energy. IEDs in the system capable of communicating their data are polled by one or more central computing systems, which store and process the data sent by the IEDs for analysis and reporting to the operator. Communications for each IED must be custom-configured during system commissioning, a very time consuming and expensive process that is prone to human error. An alternative to having a central computing system poll IEDs for data is to have the IED push data either to internal or external central computing systems, such as an internet hosted computer server. While this configuration saves the expense of having a central computing system local to the network of IEDs, configuration of such systems remains complex.

What is needed is at least an energy efficiency solution wherein the IEDs automatically push their data via the Internet to a central server. Aspects and embodiments disclosed herein are directed to addressing/solving these and other needs.

SUMMARY OF THE INVENTION

According to an aspect of the present disclosure, a method of automatically uploading data indicative of a characteristic of a utility measured by a plurality of intelligent electronic devices (IEDs) in a utility system to a central server via the Internet, includes: prior to commissioning of a first of the IEDs in the utility system, configuring the first IED to automatically push first data indicative of the characteristic of the utility measured by the first IED to the central server via the Internet; and configuring the first IED with a unique identifier that is distinct from all other identifiers associated with every other one of the IEDs in the utility system and storing the unique identifier in a memory of the first IED. Responsive to installing the first IED in the utility system, the method further includes automatically pushing the first data by the first IED to the central server and storing the first data on the central server; and hosting a website on the central server, the website including a webpage for displaying information based on the first data.

The automatically pushing can be carried out via an Internet Protocol. The automatically pushing can include transmitting from the first IED to the central server the unique identifier associated with the first IED, and the method can further include associating, at the central server, the unique identifier with a customer.

The method can further include receiving an indication, via the website, of a modification to a configuration of the first IED and transmitting, via the Internet, configuration information indicative of the modified configuration to the first IED to cause the configuration of the first IED to be changed responsive to the first IED sending to the central server a request for a configuration change. The method can further include storing in the first IED a uniform resource identifier corresponding to an IP address or name of the central server.

The method can further include, prior to the commissioning of the first IED, associating the unique identifier with a customer. The method can further include storing, on the central server, a data-type database that includes a type of data measured by each type of the IEDs and the device type of each of the IEDs, wherein the data type includes energy or power. The automatically pushing can be carried out via a web service client installed on the first IED.

The method can further include requesting, via the website, a change in the amount or type of data automatically pushed by the first IED, and, responsive thereto, causing the first IED to change the amount or the type of the data automatically pushed to the central server. The method can further include indicating, via the website, a periodicity of automatic pushes of the first data by the first IED to the central server or a periodicity of sampling or measuring of the characteristic of the utility by the first IED, and, responsive thereto, causing the first IED to change the periodicity of automatic pushes of the first data or the sampling or measurement of the characteristic of the utility by communicating information indicative of the periodicity from the central server to the first IED via the Internet.

The automatically pushing can further include: requesting, via the first IED, whether a configuration update exists for the first IED; and, if so, requesting of the central server by the first IED the configuration update via the Internet, communicating the configuration update from the central server to the first IED responsive to the request by the first IED, updating in the first IED a configuration corresponding to the configuration update, and automatically pushing the first data according to the updated configuration.

The characteristic of the utility can include current, voltage, energy, demand, or power. The method can further include: prior to installation of a second of the IEDs in the utility system, configuring the second IED to automatically push second data indicative of the characteristic of the utility measured by the second IED to the central server via the Internet; and configuring the second IED with a unique identifier that is distinct from all other identifiers associated with every other one of the IEDs including the first IED in the utility system and storing the unique identifier associated with the second IED in a memory of the second IED; responsive to installing the second IED in the utility system, automatically pushing the second data by the second IED to the central server and storing the second data on the central server; and displaying, via the central server, information based on the second data.

The first data can be associated with a first customer of the utility system and the second data can be associated with a second customer of the utility system. The method can further include hosting a second website on the central server. The second website can include a webpage for displaying the information based on the second data. The method can further include: receiving first authentication information from a user accessing the website for displaying the information based on the first data; authenticating the first authentication information; and responsive to the authenticating, allowing or disallowing access to the website.

According to another aspect of the present disclosure, a method of automatically communicating data indicative of a characteristic of a utility measured by a plurality of intelligent electronic devices (IEDs) in a utility system to a central server via the Internet, includes: prior to installation of the IEDs in the utility system, configuring each of the IEDs to automatically push respective data indicative of the characteristic of the utility measured by each respective ones of the IEDs to the central server via the Internet; configuring each of the IEDs with a unique identifier that is distinct from all other identifiers associated with every other one of the IEDs in the utility system and storing the unique identifier in a respective memory of each of the IEDs; associating, at the central server, at least some of the unique identifiers with a first customer; responsive to installing the IEDs in the utility system, automatically pushing the respective data by each of the IEDs to the central server via an Internet Protocol and storing the respective data on the central server, wherein the automatically pushing includes transmitting from each of the IEDs to the central server the unique identifier associated with each respective one of the IEDs; hosting a website on the central server, the website including at least one webpage for displaying information based on the data automatically pushed by at least one of the IEDs.

The configuring to automatically push can include storing in at least some of the IEDs a uniform resource identifier corresponding to an IP address of the central server. The characteristic of the utility can include energy. The method can further include: storing, on the central server, a database that includes configuration parameters or settings corresponding to each type of the IEDs; and receiving an indication, via the webpage, of a modification to a configuration of the first IED and transmitting, via the Internet, configuration information indicative of the modified configuration to the first IED to cause the configuration of the first IED to be changed.

The automatically pushing can include: requesting, via a first one of the IEDs, whether a firmware update exists for the first IED; and, if so, requesting of the central server by the first IED the firmware update via the Internet, communicating the firmware update from the central server to the first IED responsive to the request by the first IED, updating in the first IED a configuration corresponding to the firmware update, and automatically pushing the first data according to the updated firmware. The method can further include requesting, via the webpage, a change in the amount or type of the first data automatically pushed by a first one of the IEDs, and, responsive thereto, causing the first IED to change the amount or the type of the first data automatically pushed to the central server.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
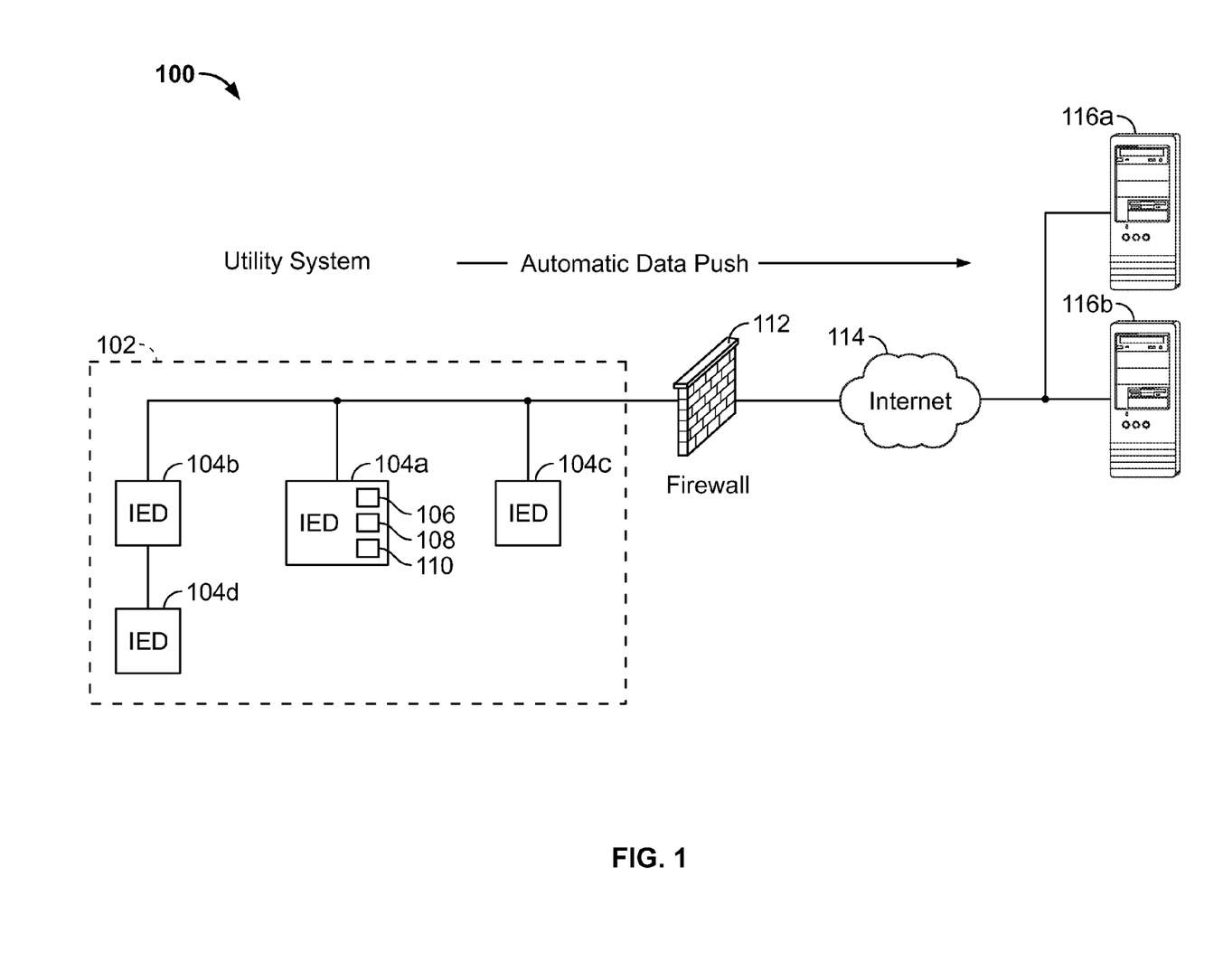
FIG. 1 is a functional block diagram of a system that includes some of the elements used in aspects of the present disclosure.

FIG. 1 is a system 100 that includes a utility system 102, such as an energy distribution system, connected to the Internet 114, via an optional firewall 112, and one or more central servers 116a,b. The utility system 102 includes a plurality of IEDs 104a,b,c,d communicatively coupled to the Internet 114. The IED 104d is a slave to the master IED 104b. Each IED 104 includes one or more sensors 106 for sensing one or more characteristics of the utility being monitored or measured by the IED 104. Those characteristics can include any combination of current, voltage, power, energy, waveform distortion, demand, and the like. Each IED 104 also includes a controller 108 coupled to a memory 110. For convenience, only IED 104a is shown with the sensor(s) 106, the controller 108, and the memory 110, though it should be understood that the other IEDs also include these components. Other conventional components found in an IED, such as a wireless or wired communications interface (e.g., Ethernet or WiFi), are not shown for ease of illustration.

Some non-limiting examples of the IEDs include a PowerLogic® Series CM3xxx/CM4xxx Circuit Monitor 114, 116 available from Schneider Electric, or a PowerLogic® Series PM7xx/8xx Power and Energy Meter 118, 120, or a PowerLogic® ION7550/7650 Power and Energy Meter. A few other examples of IEDs include a Micrologic® Trip Unit, or a microprocessor-based circuit breaker, a programmable logic controller (PLC), a Remote Terminal Unit (RTU), an electric/watt hour meter, a fault recorder, a gateway, such as an EGX Ethernet gateway available from Schneider Electric, or a protection relay.

A Remote Terminal Unit ("RTU") is a field device installed on an electrical power distribution system at the desired point of metering. It is equipped with input channels (for sensing or metering), output channels (for control, indication or alarms), and a communications port. Metered information is typically available through a communication protocol via a serial communication port. An exemplary RTU is the XP Series, manufactured by Quindar Productions Ltd. in Mississauga, Ontario, Canada.

A Programmable Logic Controller ("PLC") is a solid-state control system that has a user-programmable memory for storage of instructions to implement specific functions such as Input/Output (I/O) control, logic, timing, counting, report generation, communication, arithmetic, and data file manipulation. A PLC includes a central processor, input/output interface, and memory. A PLC is designed as an industrial control system. An exemplary PLC is the SLC 500 Series, manufactured by Allen-Bradley in Milwaukee, Wis.

A meter is a device that records and measures power events, power quality, current, voltage waveforms, harmonics, transients, and other power disturbances. Revenue accurate meters ("revenue meter") relate to revenue accuracy electrical power metering devices with the ability to detect, monitor, report, quantify and communicate power quality information about the power which they are metering. An exemplary meter is the model 8500 meter, available from Schneider Electric.

A protective relay is an electrical device that is designed to interpret input conditions in a prescribed manner, and after specified conditions are met, to cause contact operation or similar abrupt change in associated electric circuits. A relay may consist of several relay units, each responsive to a specified input, with the combination of units providing the desired overall performance characteristics of the relay. Inputs are usually electric but may be mechanical, thermal or other quantity, or a combination thereof. An exemplary relay is the type N and KC, manufactured by ABB in Raleigh, N.C.

A fault recorder is a device that records the waveform and digital inputs, such as breaker status which resulting from a fault in a line, such as a fault caused by a break in the line. An exemplary fault recorder is the IDM, manufactured by Hathaway Corp in Littleton, Col.

IEDs can also be created from existing electromechanical meters or solid-state devices by the addition of a monitoring and control device which converts the mechanical rotation of the rotary counter into electrical pulses or monitors the pulse output of the meter. An exemplary electromechanical meter is the ABI Meter manufactured by ABB in Raleigh, N.C. Such conversion devices are known in the art.

Figure 2:
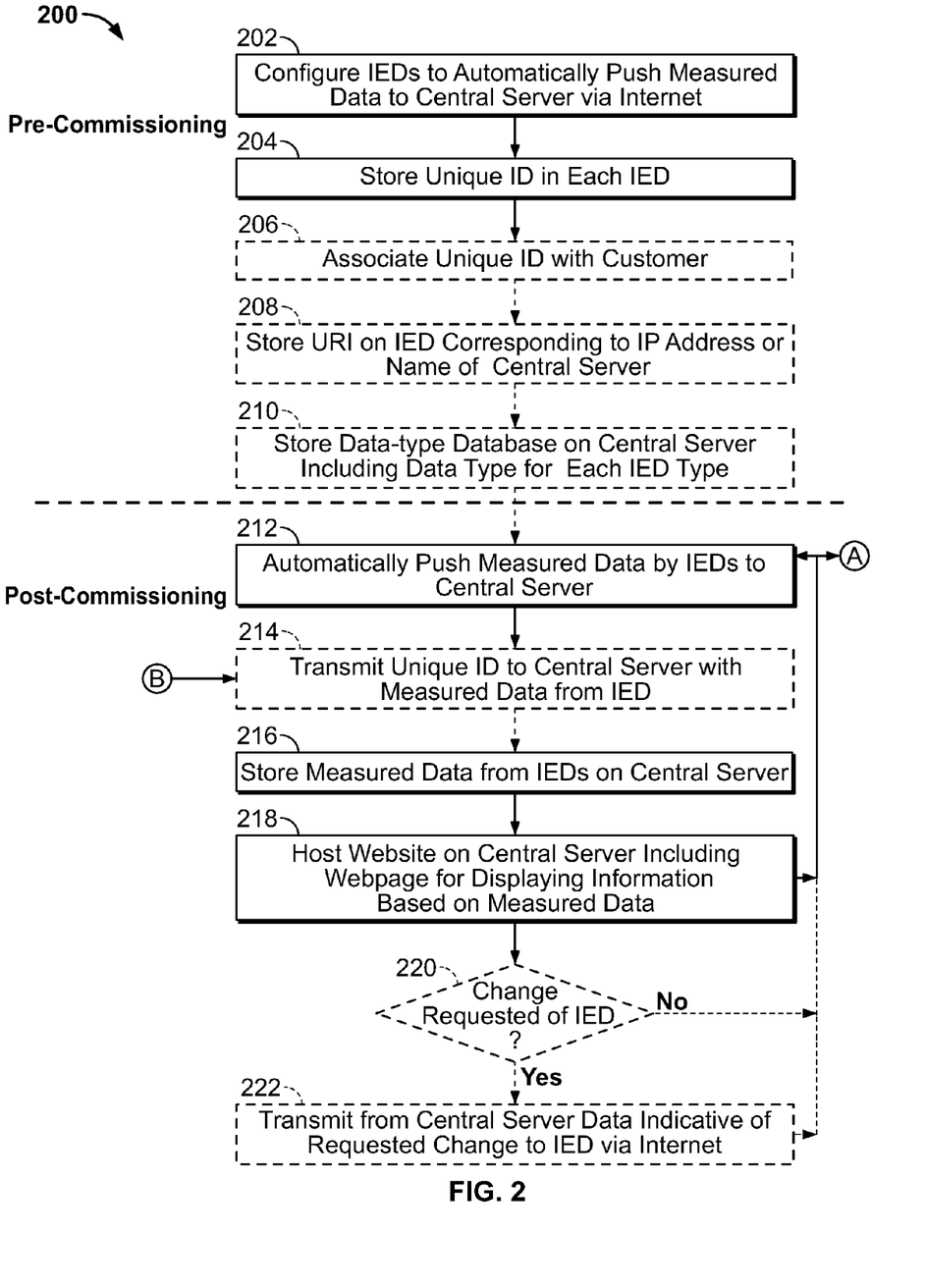
FIG. 2 is a flow chart diagram of an automatic-data push method according to various aspects disclosed herein.

FIG. 2 is a flow chart diagram of an automatic data-push ("ADP") method 200 according to various aspects of the present disclosure. The term "push" as used herein is given its technical meaning as understood by software programmers. Email is an example of a push system. Optional blocks are shown in FIG. 2 in dashed lines. The method 200 has a pre-commissioning stage and a post-commissioning stage. Commissioning of the utility system 102 refers to the steps or actions taken before the IED 104s are made operational in the utility system 102, and includes configuring the communications between the IED and the central server, configuring the software on the IED and the central server, and installing the IEDs in the customer's utility system. The pre-commissioning blocks 202-210 occur prior to the IED 104 being physically installed in the utility system 102 and communicatively connected to the Internet 114. With respect to the steps or actions that relate to configuring the IED 104 for the automatic data push aspects herein, the pre-commissioning can refer to the production or manufacturing stage of the IED and can be carried out by the manufacturer of the IED before it is installed on-site in the utility system 102.

Referring now to the pre-commissioning stage, the method 200 includes configuring the IEDs 104 to automatically push data measured or monitored by the IEDs 104 to the central server 116a or 116b via the Internet 114 (202). Preferably, the system 100 includes a single central server 116a, but in other aspects, the system 100 can include more than one central server, such as a backup server. Although one utility system 102 is shown in FIG. 1, there can be multiple utility systems operated by different customers. Each such system would be coupled via the Internet to preferably one central servers 116a or 116b or more than one central server 116a,b. The IED 104 can also be configured according to its environment, such as residential, industrial, commercial, and the like, which determines the default data to be sent to the Internet service.

The automatic-push configuration of each IED 104a-d includes configuring each IED 104a-d to automatically transmit their measured data at predetermined intervals to a Uniform Resource Identifier (URI) corresponding to an IP address or name of the central server 116a,b (208), which receives the measured data from each of the IEDs 104. An example of a URI is http://192.0.0.1/datapush. The method 200 includes storing a unique identifier or key in the memory 110 of each IED 104a-d (204). This unique identifier can be a hardware serial number or other identification code that is unique to all IEDs in all of the systems that include IEDs that automatically push their measured data to the central server(s) 116a,b. This unique identifier is akin to a vehicle identification number (VIN) stamped on each engine block of an automobile, wherein each VIN is unique regardless of the manufacturer, date of manufacturer, place of manufacture, type of automobile, vehicle attributes, etc. Each unique ID stored in each IED 104a-d is associated with a corresponding customer (206). There can be different customers whose IED data is stored on the central server 116a,b, but each unique ID is associated with one customer. Additional basic customer information can also be stored with the customer record in the central server 116, and when a new customer purchases a system, the central server 116 that stores the data from the IEDs in the new system is configured with the basic customer information such that each time the customer purchases a new IED for use in the system, the unique identifier from the new IED is associated with the record associated with the purchasing customer. The central server 116 can also be configured in the pre-commissioning stage with authentication information associated with the customer, such as a username and password that is required to gain entry to the website where the measured data from the IEDs can be accessed.

The IEDs 104 automatically push their data using a web services architecture or client. The IEDs 104 can communicate their measured data via the HTTP protocol over TCP/IP. As such, because firewalls are often configured to permit HTTP requests initiated within a local network to pass through an open port in the firewall, such traffic can freely pass through the firewall 112. The method 200 stores a data-type database on the central server(s) 116a,b (210). The data-type database includes a list of all the data types supported by each type of IED. For example, if certain IEDs of a first type measure only current and voltage, the data-type database includes an entry of the first type of IED along with its supported data types, i.e., current and voltage and supporting information such as data encoding schemes, units and/or scaling factors. Other IEDs can measure additional data types, such as power, energy, and the like. Thus, a data type refers to a type of data measured or monitored by the IED. A device type refers to the type of IED, typically referring to different models of a particular manufacturer.

The central server 116 can also be configured with information about all possible communicating device types so that the individual characteristics of the IEDs can be accommodated and differences among IEDs can be resolved so that comparisons between measured data from different device types can be made. This is particularly advantageous for engaging in system-wide analyses of measured data across multiple sites or multiple customers.

The bottom half of FIG. 2 refers to the post-commissioning stage, or the stage after which the IEDs 104 have been functionally installed into the utility system 102 as shown in FIG. 1. The IEDs have already been pre-configured to automatically push their measured data, via their respective controllers 108, to the IP address or name of the central server 116a in this post-commissioning stage. According to the method 200, once an IED comes online and detects a network connection, each of the IEDs 104a-d automatically push (e.g., transmit, send, or communicate) their respective measured data (whatever type or types of data the IED is configured to send) to the central server 116a (212) at predetermined intervals. Each IED 104a-d transmits their corresponding unique identifier stored in their respective memory 110 to the central server 116a along with their measured data (214). The central server 116a receives the measured data along with the corresponding unique identifier, and both are stored on the central server 116a (216). The central server 116a can include one or more protected memory partitions or segments for each customer so that each customer's measured data is not commingled with another customer's measured data in the central server 116a. The central server 116a searches for and locates the customer corresponding to the unique identifier to determine where to store the measured data.

The central server 116a hosts one or more websites that each includes one or more webpages for displaying information based on the measured data automatically pushed from the IEDs 104a-d (218). Each customer can be assigned to a different website, which can include more than one webpage, for accessing information based on the measured data received by the IEDs associated with that customer. By "based on," it is meant that the information displayed on the webpage can include graphical or textual representations of the measured data without actually displaying the measured data itself. For example, if the measured data includes a time-sequence of measured current values, the webpage may display a graph or chart of the measured current values without necessarily displaying the values themselves. Alternately, if the measured data includes energy values, the webpage can display a recommendation on reducing energy usage without displaying the actual energy values themselves, even though the recommendation is based on the actual energy values. The customer can view via the website hosted on the central server 116a KPIs, metrics, reports, and data mining capabilities, to name a few. The customer can also gain access to tools that facilitate navigation through larger systems that are composed of numerous (e.g., hundreds) of IEDs.

Via the website, the customer can also change the amount or type of measured data being automatically uploaded from an IED or the periodicity with which measured data is uploaded to the central server 116a or sampled by the IED.

Any IED 104a-d in the utility system 102 can check for updates to a configuration parameter of the IED at the time each data push is initiated with the central server 116a or at some other prescheduled time interval (220). Examples of the changes that can be requested are described in more detail below. The communication request for a change has to originate from the IED 104 in a system 100 that includes the firewall 112, because any request to directly access the IED from the central server 116a may be blocked by the firewall 112. Once the IED 104 has communicated its request, a data response can be returned back from the central server 116a through the open port of the firewall 112. In this example, the response is in the form of data indicative of the requested change, and is communicated from the central server 116a to the requesting IED 104 via the Internet 114 (222). The IED can query whether there are any configuration updates or other changes to be made periodically, such as each time the IED pushes data to the central server 116a, or at other predetermined times or intervals.

Figure 3A:
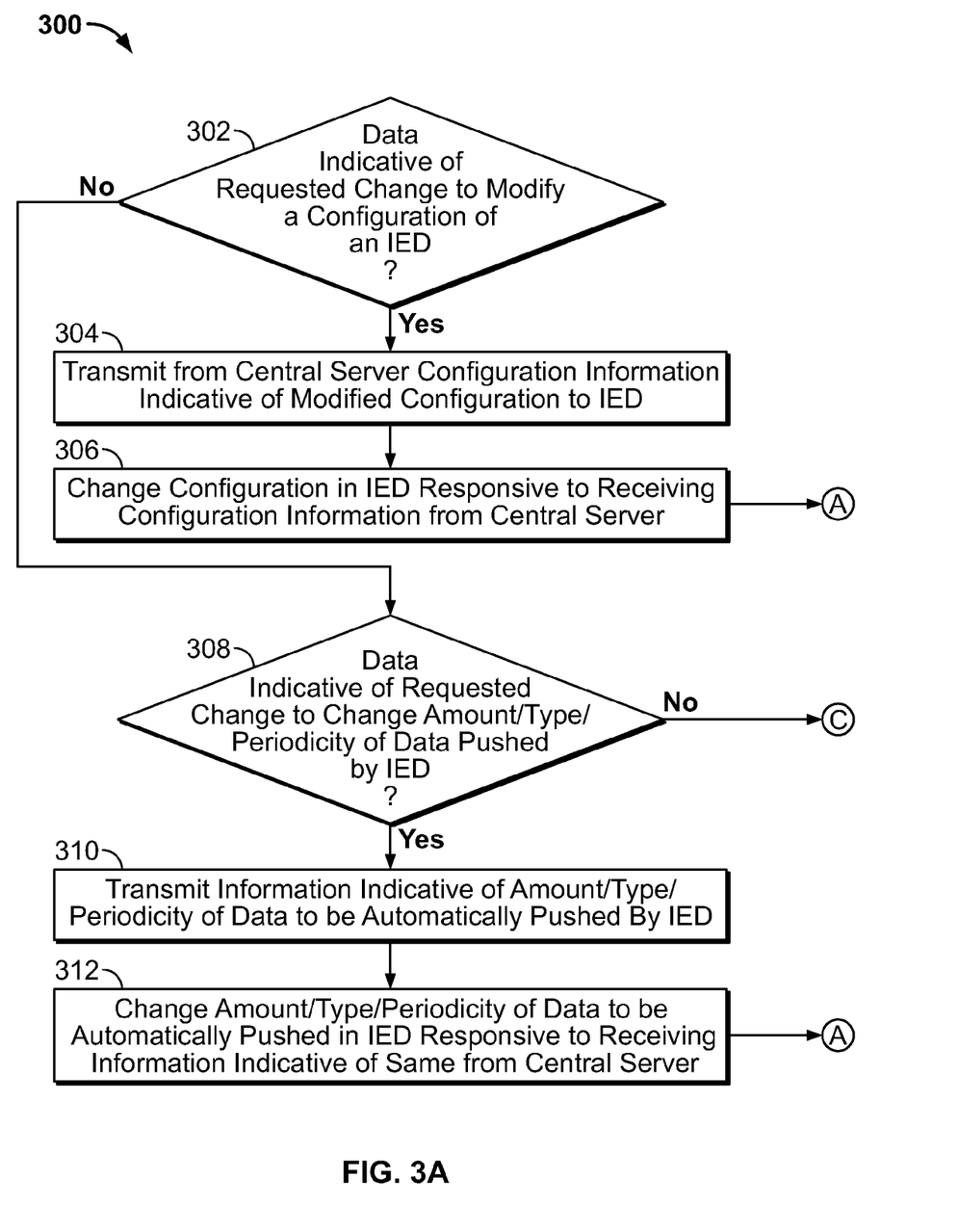
FIGS. 3A-3B are a flow chart diagram of various categories of changes that can be requested by an IED to cause a configuration parameter or other aspect of the IED to be modified or updated.
Figure 3B:
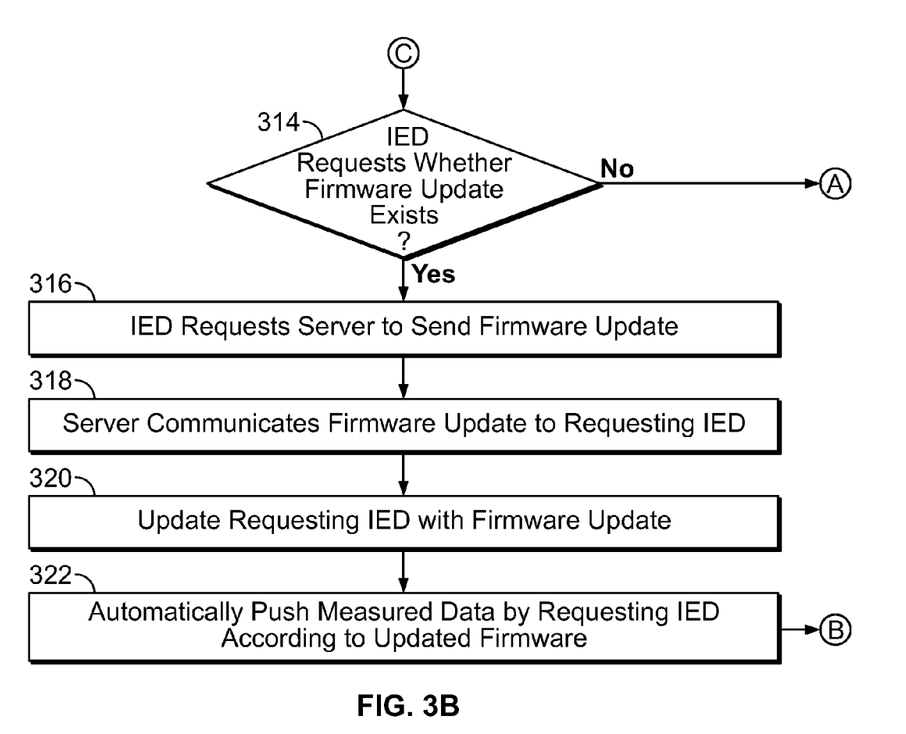

FIGS. 3A-3B is a flow chart of a method 300 relating to different types or categories of changes that can be requested by an IED 104. The IEDs 104 are programmed to periodically send requests to the central server 116a to query whether any changes have been requested of the IED 104. Because the requests originate from the IEDs 104, the central server 116a waits until an IED 104 sends a request before responding that a change to that IED's configuration is or is not needed. Requests for changes can be made by the operator via the webpage hosted by the central server 116a using conventional input devices.

When an operator or the central server 116a wants to modify a configuration of an IED 104 (302), the central server 116a waits until a request is posted by that IED 104, and upon receiving the request to determine whether any configuration parameter needs to be updated or changed, transmits the configuration information indicative of the modified configuration to the IED 104 (304). Preferably, an SSL connection is established between the IEDs 104 and the central server 116 for added security.

The amount, type, and/or periodicity of the measured data can also be changed. If the central server 116a receives data indicative of a request to change the amount, type, or periodicity of the measured data that is automatically pushed by an IED (308), the central server 116a again waits until a request is sent from the subject IED 104, and a value corresponding to the amount, type, or periodicity of the measured data is pushed back by the central server 116a through the open port of the firewall 112 to the requesting IED 104 (310). The amount, type, or periodicity of the measured data is changed in the IED 104 accordingly (312). The periodicity can specify how frequently an IED 104 automatically pushes its measured data to the central server 116a. For example, the periodicity can be related to the display of real-time or near real-time data on the hosted website, or, for those IEDs that lack an onboard logging capability, how often it is desired to take a snapshot of measured data to push to and store on the central server 116a.

The configuration parameter can include any one or more of the following: identification information (e.g., TENANT1BUILDING4), the IP address or name of the central server 116, units of measurement, a feature library (e.g., which IED features should be enabled or disabled), pickup and dropout alarm thresholds, user preferences and user-defined quantities, types of data for the IED to log(e.g., energy-related data), IED setup information, IED settings, a threshold of an electrical characteristic (e.g., power, current, voltage, distortion, power factor, energy, demand, harmonics) monitored by the IED, alarms, watchdogs, audit events, energy register rollover, pulse width of energy pulse outputs, clock synchronization method (e.g., synchronize to GPS, synchronize to line frequency, synchronize to internal clock), time synchronous source (e.g., COM port, optical port, Ethernet port), time zone offset, daylight savings time offset, standard or custom nameplate information (e.g., owner information, facility information, unique meter tag number, manufacturer serial number), maximum number of metrological (e.g., kWh, kVArh) records to be stored, date and time information, the size of datalogs, custom VIPs™ (an IED data aggregation and analysis component available in ION® Enterprise™ energy management software available from Schneider Electric), power demand calculation method (e.g., sliding window, thermal), power demand interval, nominal system frequency, diagnostics, operating mode parameters, peak demand, and the like. Examples of alarm thresholds include voltage thresholds (e.g., root-mean-square (RMS) values, harmonic components, total harmonic distortion), transient thresholds, and current thresholds (e.g., RMS values, harmonic components, total harmonic distortion). The parameter values correspond to a value (which can be numeric, alphanumeric, or any combination of characters) of a configuration parameter. For example, the configuration parameter "log depth" can have a parameter value "300." For example, the configuration parameter "nominal system frequency" can have a parameter value "60," which represents a frequency of 60 Hz.

The modified configuration data is pushed back by the central server 116a to the requesting IED, and the corresponding configuration in the IED is changed accordingly (306). For example, if the IED 104a sends a request to the central server 116a querying whether any configuration changes or updates exist, the central server 116a, upon receiving the request, pushes the modified configuration parameter (e.g., changing an alarm threshold) to the IED 104a, which changes that alarm threshold parameter according to the new value present in the data pushed by the central server 116a.

Another type of change is an update to the firmware stored in the memory 110 of an IED 104. The IED 104 can be programmed to specifically request periodically (e.g., once a month) whether a firmware update exists (314), which can be different from a request for a change to a configuration parameter (see FIGS. 3A and 3B). If the central server 116a receives a firmware-update request from an IED 104 (316), the central server 116a communicates the firmware update to the requesting IED 104 (318). The requesting IED 104 is updated with the firmware update (320), and that ED 104 automatically begins to push out its measured data according to the updated firmware (322). Alternately, an operator can request a firmware update to an IED like requesting any other configuration change. Once the IED is aware of the request from the operator, the IED will auto-update itself.

Figure 4:
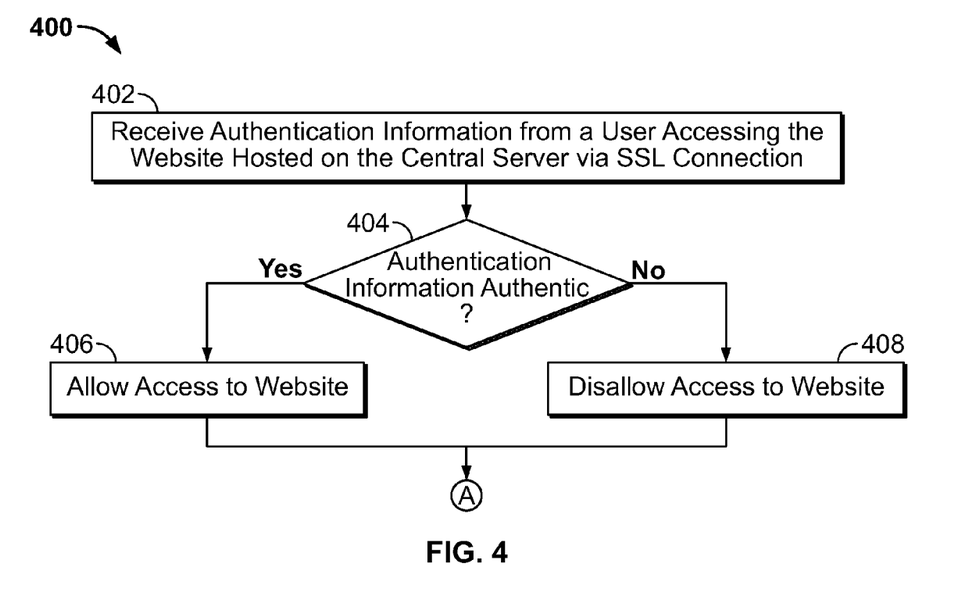
FIG. 4 is a flow chart diagram of an authentication routine according to a specific aspect disclosed herein.

FIG. 4 is an authentication method 400 for authenticating a user attempting to access the website hosted on the central server 116a. The central server 116a receives authentication information (e.g., a username and password) from a user attempting to access a website hosted on the central server 116a (402). The central server 116a determines whether the authentication information is authentic (404). If so, the central server 116a allows the user access to the website (406), otherwise it disallows such access (408). For added security, an SSL connection can be established between the user's web browser and the central server 116.

According to the aspects disclosed herein, the IEDs 104 are "plug and play" in the sense that once installed, they automatically begin to push their measured data to a common source via the Internet unhindered by any intervening firewalls. The central server 116 can be administered and maintained by a third party unrelated to the customers of the IEDs. The IEDs are preconfigured at the time of manufacture and before deployment in a utility system so that they can automatically push their measured data to a predetermined IP address. Even if the configuration of the IED is modified, the IED will continue to automatically push their data without requiring any configuration by the operator.

The aspects disclosed herein avoid the need for on-site servers and software and associated commissioning, configuration, and maintenance expenses. The IEDs do not have to be individually and manually configured during installation with appropriate communication parameters. Because the data is pushed out to the Internet 114, the data can pass through a corporate firewall, eliminating any need to modify firewall settings for a non-push solution.

The operator also need only interact with the web pages on the website hosted by the central server 116 to cause changes to be made to the IEDs 104 without having to run any specialized tools on-site or to connect directly to any IEDs 104. All interactions are made via the webpages and appear to be totally transparent to the operator independent of IED type, communication parameters, or location in the utility system.

An exemplary sequence of events will now be described to illustrate how a customer can utilize the automatic-data push aspects disclosed herein. The customer purchases an energy efficiency solution as described herein, which includes one or more IEDs and a data hosting service. The factory (manufacturer) configures the purchased IEDs to enable auto-upload of device data to a predefined IP address corresponding to an Internet server, such as the central server 116a. The factory uses a tool to associate a unique device identifier for each IED being purchased with information about the customer. The factory generates a website access code (e.g., username and password) and sends it to the customer. A factory representative commissions the IEDs at the customer site and connects them to a network that can access the Internet 114, via a firewall 112 if one is present. The IEDs come online and begin to automatically push energy data or other measured data to the Internet server along with their associated unique identifiers. The Internet server receives and stores the measured data automatically. The customer logs on to the Internet server via the energy efficiency website using the code (username and password) supplied by the factory. The Internet server uses the known relationship between the unique identifiers and the customer's identity to generate actionable information based on the measured data from the customer's site (e.g., utility system 102). The customer can request other data views that are not presently available via the website, and the IEDs can be reconfigured via the website to push the requested data to the Internet server. As noted above, the IEDs initiates a request for changes from the Internet server when a firewall 112 is present.

Through the automatic-data push aspects disclosed herein, the customer can instantly start viewing information based on the automatically pushed measured data by the IEDs. The central server provider can provide diagnostic capabilities, benchmarks against peers or competitors in the same industry, and the like based on all of the measured data collected at the central server. Such "holistic" perspective of multiple sites allows an energy efficiency solution provider to provide benchmarks not previously possible, particularly because customers are typically reluctant to share their measured data with peers and certainly with competitors. From the perspective of the energy efficiency solution provider, the automatic-data push aspects herein enable a multi-tenanted hosting of multiple customers across multiple sites without the need for multiple on-site servers and customized solutions and configurations unique to specific customers. Each customer can securely access their own data, while deriving the benefit of anonymous data mining across multiple sites and customers.

Any of these algorithms (e.g., 200, 300, 400) include machine readable instructions for execution by: (a) a processor, (b) a controller, and/or (c) any other suitable processing device. It will be readily understood that the controller 108 and the central server(s) 116a,b include such a suitable processing device. Any algorithm disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine readable instructions represented in any flowchart depicted herein may be implemented manually. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of automatically uploading data indicative of a characteristic of a utility measured by a plurality of intelligent electronic devices (IEDs) in a utility system to a central server via the Internet, comprising:

prior to commissioning of a first of the IEDs in the utility system,
configuring the first IED to automatically push first data indicative of the characteristic of the utility measured by the first IED to the central server via the Internet; and
configuring the first IED with a unique identifier that is distinct from all other identifiers associated with every other one of the IEDs in the utility system and storing the unique identifier in a memory of the first IED;

responsive to installing the first IED in the utility system, automatically pushing the first data by the first IED to the central server and storing the first data on the central server, wherein the automatically pushing includes requesting, via the first IED, whether a configuration update exists for the first IED, and, if so,
requesting of the central server by the first IED the configuration update via the Internet,
communicating the configuration update from the central server to the first IED responsive to the request by the first IED,
updating in the first IED a configuration corresponding to the configuration update, and
automatically pushing the first data according to the updated configuration; and hosting a website on the central server, the website including a webpage for displaying information based on the first data; and requesting, via the website, a change in the amount or type of data automatically pushed by the first IED, and, responsive thereto, causing the first IED to change the amount or the type of the data automatically pushed to the central server.

2. The method of claim 1, wherein the automatically pushing is carried out via an Internet Protocol.

3. The method of claim 2, wherein the automatically pushing is carried out via a web service client installed on the first IED.

4. The method of claim 1, wherein the automatically pushing includes transmitting from the first IED to the central server the unique identifier associated with the first IED, the method further comprising associating, at the central server, the unique identifier with a customer.

5. The method of claim 4, further comprising:
storing, on the central server, a data-type database that includes a type of data measured by each type of the IEDs and the device type of each of the IEDs; and
receiving an indication, via the website, of a modification to a configuration of the first IED and transmitting, via the Internet, configuration information indicative of the modified configuration to the first IED to cause the configuration of the first IED to be changed responsive to the first IED sending to the central server a request for a configuration change.

6. The method of claim 1, further comprising receiving an indication, via the website, of a modification to a configuration of the first IED and transmitting, via the Internet, configuration information indicative of the modified configuration to the first IED to cause the configuration of the first IED to be changed responsive to the first IED sending to the central server a request for a configuration change.

7. The method of claim 1, wherein the configuring the first IED to automatically push first data includes storing in the first IED a uniform resource identifier corresponding to an IP address or name of the central server.

8. The method of claim 1, further comprising, prior to the commissioning of the first IED, associating the unique identifier with a customer.

9. The method of claim 8, wherein the characteristic of the utility includes current, voltage, energy, demand, or power, the method further comprising storing, on the central server, a data-type database that includes a type of data measured by each type of the IEDs and the device type of each of the IEDs, wherein the data type includes energy or power.

10. The method of claim 1, further comprising storing, on the central server, a data-type database that includes a type of data measured by each type of the IEDs and the device type of each of the IEDs, wherein the data type includes energy or power.

11. The method of claim 1, further comprising indicating, via the website, a periodicity of automatic pushes of the first data by the first IED to the central server or a periodicity of sampling or measuring of the characteristic of the utility by the first IED, and, responsive thereto, causing the first IED to change the periodicity of automatic pushes of the first data or the sampling or measurement of the characteristic of the utility by communicating information indicative of the periodicity from the central server to the first IED via the Internet.

12. The method of claim 1, wherein the characteristic of the utility includes current, voltage, energy, demand, or power.

13. The method of claim 1, further comprising:
prior to installation of a second of the IEDs in the utility system,
configuring the second IED to automatically push second data indicative of the characteristic of the utility measured by the second IED to the central server via the Internet; and
configuring the second IED with a unique identifier that is distinct from all other identifiers associated with every other one of the IEDs including the first IED in the utility system and storing the unique identifier associated with the second IED in a memory of the second IED;
responsive to installing the second IED in the utility system, automatically pushing the second data by the second IED to the central server and storing the second data on the central server; and
displaying, via the central server, information based on the second data.

14. The method of claim 13, wherein the first data is associated with a first customer of the utility system and the second data is associated with a second customer of the utility system, the method further comprising hosting a second website on the central server, the second website including a webpage for displaying the information based on the second data.

15. The method of claim 13, further comprising:
receiving first authentication information from a user accessing the website for displaying the information based on the first data;
authenticating the first authentication information; and responsive to the authenticating, allowing or disallowing access to the website.

16. A method of automatically communicating data indicative of a characteristic of a utility measured by a plurality of intelligent electronic devices (IEDs) in a utility system to a central server via the Internet, comprising:

prior to installation of the IEDs in the utility system,
configuring each of the IEDs to automatically push respective data indicative of the characteristic of the utility measured by each respective ones of the IEDs to the central server via the Internet;

configuring each of the IEDs with a unique identifier that is distinct from all other identifiers associated with every other one of the IEDs in the utility system and storing the unique identifier in a respective memory of each of the IEDs; associating, at the central server, at least some of the unique identifiers with a first customer;

responsive to installing the IEDs in the utility system, automatically pushing the respective data by each of the IEDs to the central server via an Internet Protocol and storing the respective data on the central server, wherein the automatically pushing includes transmitting from each of the IEDs to the central server the unique identifier associated with each respective one of the IEDs, the automatically pushing further including requesting, via a first one of the IEDs, whether a firmware update exists for the first IED, and, if so, requesting of the central server by the first IED the firmware update via the Internet, communicating the firmware update from the central server to the first IED responsive to the request by the first IED, updating in the first IED a configuration corresponding to the firmware update, and automatically pushing the first data according to the updated firmware; and hosting a website on the central server, the website including at least one webpage for displaying information based on the data automatically pushed by at least one of the IEDs, and requesting, via the webpage, a change in the amount or type of the first data automatically pushed by a first one of the IEDS, and, responsive thereto, causing the first IED to change the amount or the type of the first data automatically pushed to the central server.

17. The method of claim 16, wherein the configuring to automatically push includes storing in at least some of the IEDs a uniform resource identifier corresponding to an IP address of the central server, and wherein the characteristic of the utility includes energy, the method further comprising:

storing, on the central server, a database that includes configuration parameters or settings corresponding to each type of the IEDs; and receiving an indication, via the webpage, of a modification to a configuration of the first IED and transmitting, via the Internet, configuration information indicative of the modified configuration to the first IED to cause the configuration of the first IED to be changed.

* * * * *